No. 638,071. Patented Nov. 28, 1899.
C. H. SCOTT.
APPARATUS FOR USE IN MANUFACTURING INLAID LINOLEUM.
(Application filed July 26, 1898.)
(No Model.) 4 Sheets—Sheet 4.
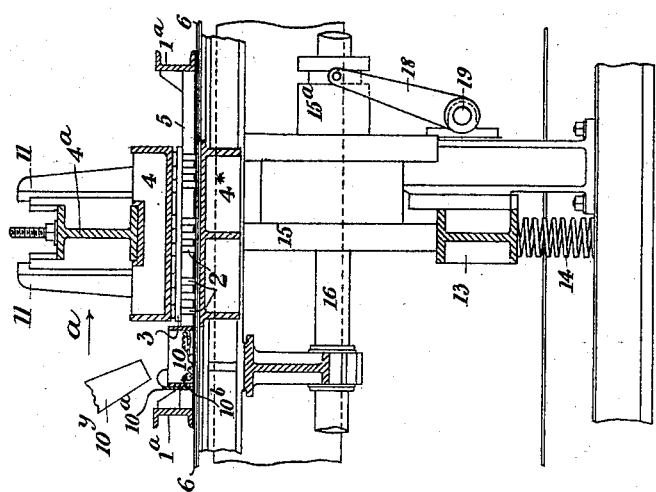
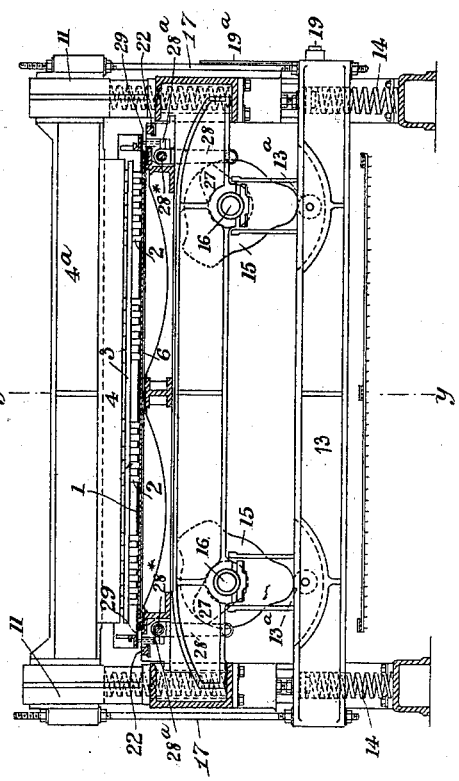
Witnesses:
C. L. Belcher
W. H. Capel.
Inventor
Charles H. Scott
By
Attorney

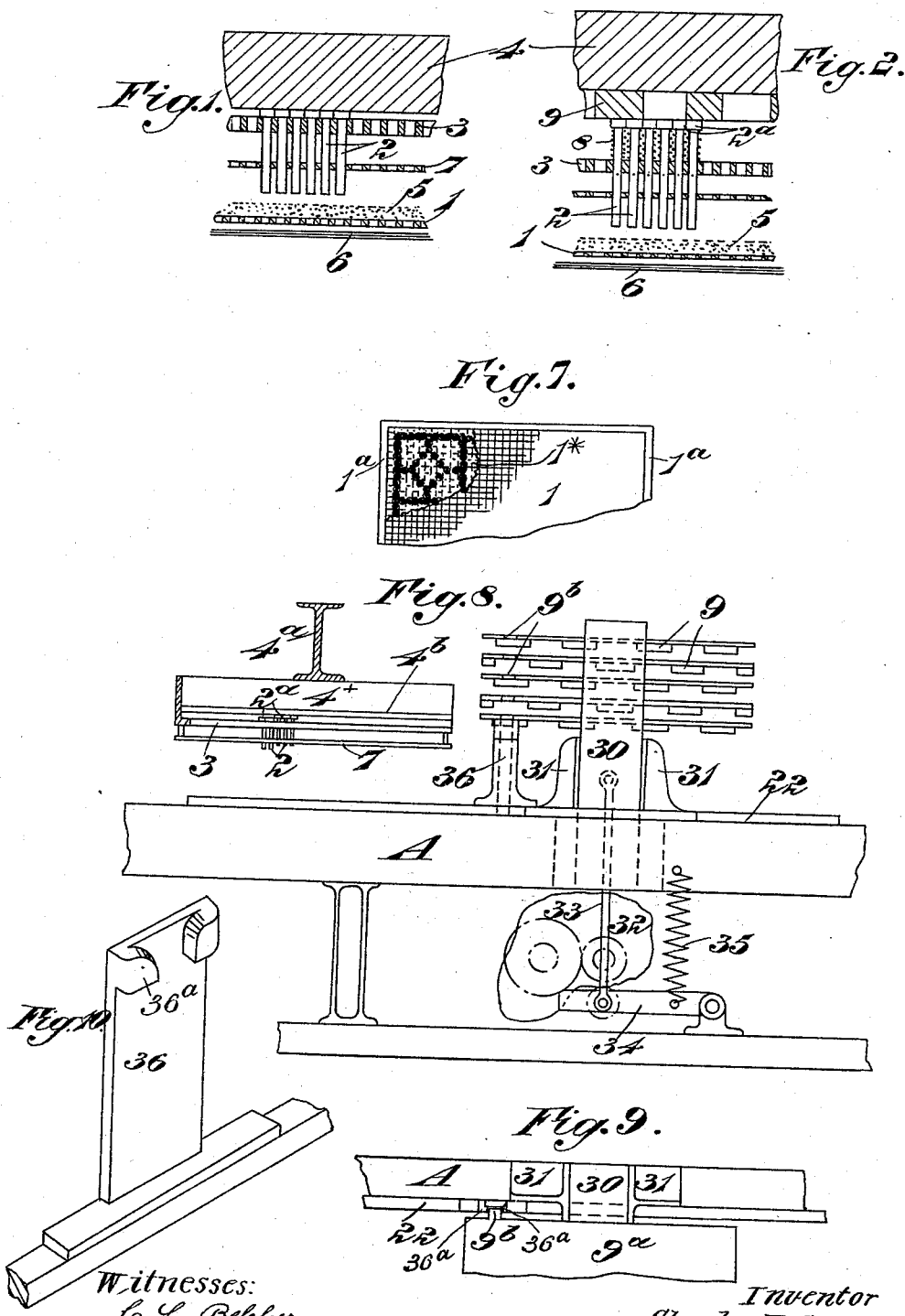

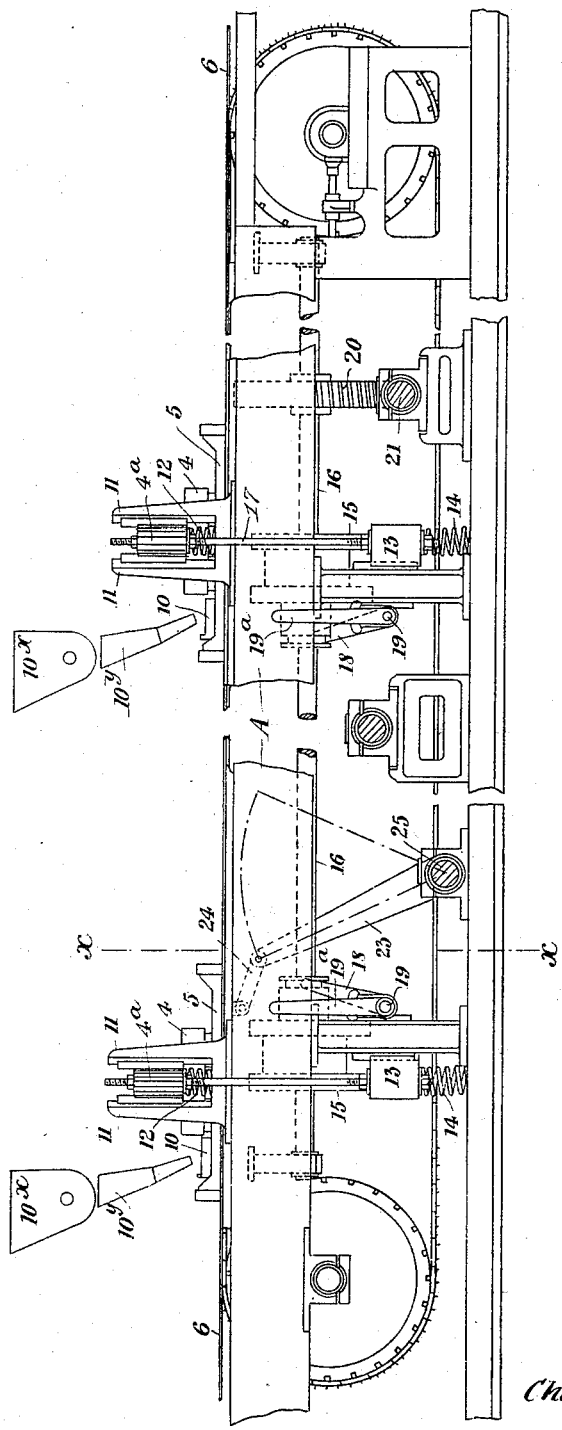

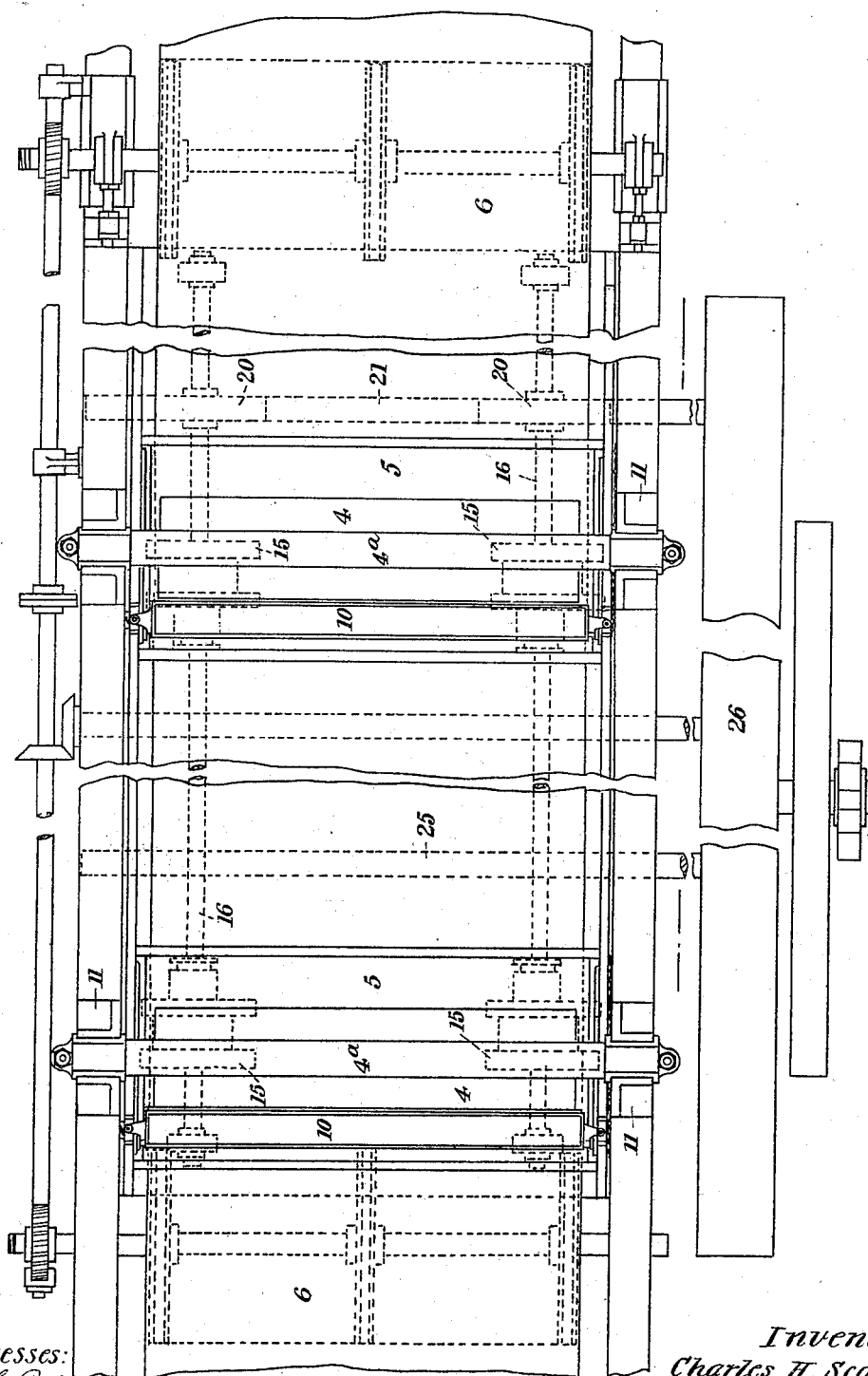

UNITED STATES PATENT OFFICE.

CHARLES HERBERT SCOTT, OF GLOUCESTER, ENGLAND.

APPARATUS FOR USE IN MANUFACTURING INLAID LINOLEUM.

SPECIFICATION forming part of Letters Patent No. 638,071, dated November 28, 1899.

Application filed July 26, 1898. Serial No. 686,911. (No model.)

*To all whom it may concern:*

Be it known that I, CHARLES HERBERT SCOTT, a subject of the Queen of Great Britain and Ireland, residing at Gloucester, in the county of Gloucester, England, have invented Improvements in Means or Apparatus for Use in the Manufacture of Inlaid Linoleum, (for which I have obtained a patent in Great Britain, No. 979, dated January 13, 1898,) of which the following is a specification.

In the manufacture of inlaid linoleum it has heretofore been common to use stencil-plates formed of plain sheet metal formed with large perforations, the shape of which depends upon that of the pattern to be produced, and through which linoleum material is forced onto a backing by correspondingly-shaped plungers. Such stencil-plates and plungers are costly to construct, and, moreover, one set of them is suitable only for producing one pattern, so that for producing several patterns a corresponding number of sets of stencil-plates and plungers are necessary.

Now this invention has for its object to obviate the foregoing disadvantages and to provide a single set of stencil-plates and plungers that can be readily adapted for producing an infinite variety of patterns, as I shall now describe, with reference to the accompanying illustrative drawings, wherein—

Figure 1 shows in vertical section a portion of a stencil-plate, with plungers, pressure-block, and adjacent parts, according to this invention. Fig. 2 is a similar view to Fig. 1, showing a modified arrangement. Figs. 3, 4, and 5 show, respectively, in side elevation, plan, and cross-section on the line $x\,x$ of Fig. 3 part of one construction of machine suitable for carrying out my invention. Fig. 6 is a part longitudinal section on the line $y\,y$ of Fig. 5. Fig. 7 is a part plan of the stencil-plate shown in Fig. 6. Fig. 8 is a part side elevation, Fig. 9 a part plan, and Fig. 10 a detail view, illustrating a modified arrangement.

According to this invention each stencil-plate 1 (see Fig. 1) is made of perforated or reticulated sheet material, the perforations in which are made of small and uniform size— say of circular shape and of about one-eighth or three-sixteenths of an inch in diameter—and in conjunction with such a plate there are provided a number of vertically-movable plungers 2, the diameters of which correspond to that of the holes in the plate, the said plungers being held in a correspondingly-perforated vertically-movable plate 3 and depressed at the required times by a vertically-movable pressure-block 4.

The holes in the stencil-plate 1 not required for the particular pattern to be produced may be stopped in any suitable manner, as by a sheet $1^x$, Fig. 7, of perforated paper or other material the outline of the perforation or perforations in which corresponds or correspond to the outline of the part of the pattern to be produced by the stencil, and the corresponding set of plungers 2 are so placed in the top plate 3 as to correspond with the unstopped holes. Linoleum 5 in the form of granulated material or in the form of sheet material is placed over the stencil-plate 1 by suitable means and the plungers 2 are caused to descend and force the linoleum that is over the holes through the same onto a suitable backing 6, which is caused to move in an intermittent manner below the stencil-plate 1, these operations being repeated as often as may be necessary for the pattern being produced. In this way the backing is more or less covered with a number of small cylinders or blocks of linoleum, which are afterward pressed or rolled, and thus made to completely cover the backing. Instead of stopping the holes not required for the pattern being produced by paper or other material they may be stopped by wax or similar substance.

The holes in each stencil-plate should be made as small as practicable, so that as little as possible of the granulated-linoleum mixture 5, when such mixture is used, will fall through the same before the descent of the plungers 2. The holes may be made so small that the material mentioned will not fall unaided through them. In this case the holes not required for any particular pattern need not be stopped, the plungers only being properly arranged to suit the pattern to be produced. A perforated plate 7 is or may be fitted to slide on or relatively to the plungers 2 for the purpose of removing any linoleum mixture that may adhere between them. This plate may be fixed or be caused to descend and press lightly on the surface of the loose material 5 before the plungers do so.

In order to obviate the necessity of rearranging the plungers 2 in their perforated supporting-plates 3 according to the pattern to be produced, the said plungers may, as shown in Fig. 2, be so supported—as by springs 8, arranged between their heads $2^a$ and the supporting-plate 3, through which they extend and which in this case is stationary—that only those plungers whose heads are acted upon by a suitably-shaped block 9, (hereinafter called a "pattern-block,") attached to the under side of the pressure-block 4, will be depressed when the pressure and pattern blocks are depressed. The pattern-blocks 9 will correspond in plan with the particular part of the pattern to be produced and may be slid into position on the bottom of the corresponding pressure-block 4. By providing a number of such pattern-blocks and inserting them successively into position to be acted upon by the respective pressure-blocks patterns of considerable length and variety can be readily and cheaply produced. Such pattern-blocks may be connected and arranged to be fed forward after the manner of jacquard-cards, the action of which they more or less imitate.

As will be obvious, my invention can be used in linoleum-making machines which in other respects may be variously constructed.

In the machine shown in Figs. 3 to 6, inclusive, each of the stencil-plates 1, made as thin as practicable and stiffened at the edges, as by being secured to a frame $1^a$, (see Fig. 6,) is provided with a tiering-box 10, which is arranged to travel forward and backward over the surface of the plate and has its rear side $10^a$ vertically adjustable in order to vary, according to requirement, the rate of flow of linoleum mixture 5 from the box through the slit $10^b$, and consequently the depth of the layer of such mixture deposited on the plate 1 during the forward motion of the box. The linoleum mixture may be fed by a feeding device $10^x$ and chute $10^y$ into each tiering-box when the same is in its rearward position. Above each stencil-plate is a vertically-movable pressure-block 4 and a series of plungers 2, adapted to fit the perforations in the stencil-plate 1. Below the several stencil-plates the backing 6 is caused to move in a step-by-step manner by an endless conveyer, such as that described in the specification of another application for Letters Patent filed by me, Serial No. 686,910. Each time the backing comes to rest the tiering-box 10 of each stencil-plate 1 is caused to move in one direction—say the forward direction, shown by the arrow $a$ in Fig. 6—and deposit all over the said plate a layer of linoleum mixture 5 of suitable thickness. When the box has arrived at the end of its forward movement, the corresponding pressure-block 4 is caused to descend and cause the corresponding plungers 2 to compress the linoleum mixture 5 which is over the corresponding perforations in the stencil-plate 1 onto the backing 6 until the level of such material practically coincides with the lower surface of the stencil-plate 1, whereupon the said stencil-plate is slightly raised by suitable means, after which the pressure-block and plungers are again raised and the tiering-box returned to its starting position. In some cases the plungers may first compress the linoleum through the perforations to the level of the upper surface of the stencil-plate, then rise, after which the box is returned to its starting position, so that during the return movement of the box loose linoleum mixture on the plate will be caused to reënter the box through the slit $10^b$ at its lower rear end and also to enter and completely fill any perforations or parts thereof in the stencil-plate 1 which may not be already filled. The pressure-block 4 and plungers 2 are then caused to again descend and further compress the material in the perforations of the stencil-plate until the level of such material practically coincides with the lower surface of the said plate, whereupon the stencil-plate is slightly raised, as before, after which the pressure-block 4 and plungers 2 are again raised. The backing 6, with the compressed pieces of linoleum thereon, is in either case then moved forward a suitable distance, the stencil-plate lowered, and the above-described operations repeated.

Each block 4, with plungers 2, Fig. 1, can be raised and lowered by any convenient means. In the example shown each block is carried by a cross-piece $4^a$, the ends of which are arranged to work vertically in guideways in standards 11 and are carried by springs 12, which tend to raise and hold the block, with plungers, in the raised position. Each block is moved downward against the action of its springs 12 by a transverse beam 13, which is arranged below the stationary table 4 and is moved downward against the action of springs 14 by cams 15, arranged to be rotated by two longitudinal shafts 16 and to act against antifriction-rollers $13^a$ on the beam 13. The connection between the blocks 4 and cross-pieces $4^a$ and the means for depressing them may be such that any one of the blocks can be put out of action while the machine continues in motion. For this purpose each block 4, through its cross-piece $4^a$, may be connected to the corresponding beam 13 below it by a pair of rods 17, so that the block and beam rise and fall together, and the cams 15 are feathered to the shafts 16, so that they will rotate therewith, but are capable of being moved endwise thereon by forked levers 18, which engage grooved bosses $15^a$ on the cams and are fixed on a rock-shaft 19, provided with a hand-lever $19^a$, the arrangement being such that by operating the hand-lever in one direction or the other the pair of cams can be brought over or moved from above the beam 13, according as it is desired to put the corresponding block in or out of operation. The cams 15 are each formed with one or two projecting or operative parts, (two are shown in Fig. 5,) so that they will act to depress the pressure-block and plungers once or twice, as may be desired, for each rotation of the shafts 16, as and for the purposes hereinbefore explained. The said shafts may be driven through worm-gearing 20 from a transverse driving-shaft 21.

In the example shown the tiering-boxes 10 are moved backward and forward over their respective stencil-plates 1 by longitudinal tiering-bars 22, to which they are attached and which are caused to move to and fro on the framing A of the machine by a pair of lever-arms 23, that are connected to the said bars by links 24 and are fixed to a rock-shaft 25, which extends from one side of the machine and is rocked at the required times by suitable means, such as cams, located within a casing 26. Each tiering-box 10 is arranged to travel on the sides of the frame $1^a$ of the corresponding stencil-plate 1, and a lateral to-and-fro jigging motion may be imparted to it in the manner and for the purpose explained in my said other specification. The tiering-bars 22 may be connected to any suitable arrangement of energy-accumulator that will serve to cushion them and their attached parts at each end of their strokes and by then giving out energy facilitate their movement in the reverse direction.

The vertical movement of each stencil-plate 1 may conveniently be effected at the required times by cams 27, fixed on the shafts 16 and arranged to act upon the long arms 28 of bell-crank levers pivoted at $28^x$, so as to raise the short arms $28^a$ of such levers and through vertically-adjustable screws 29 slightly raise the stencil-plate and hold the same raised until the pressure-block, with plungers, has been again raised, and the backing 6, with pieces of linoleum thereon, has been fed forward another step, when it is allowed to fall back onto the table of the machine. The extent of lift of the plate can be varied by adjusting the screws 29 vertically.

Figs. 8, 9, and 10 show means whereby any one of a number of pattern-plates $9^a$, with pattern-blocks 9 thereon, can be slid into position beneath a pressure-block 4. In this case the several pattern-plates are supported horizontally one above the other by and between a pair of lateral supports 30, that are arranged to be moved downward between guides 31 by stepped cams 32, acting through connecting-rods 33 and levers 34, and to be raised by the action of springs 35 or their equivalent. The pattern-plates $9^a$ are each slid endwise into a box $4^x$, belonging to the corresponding pressure-block 4 and cross-piece $4^a$, by a pair of side bars 36, which are attached to the adjacent tiering-bars 22 and each of which is provided at its upper end with a pair of lugs $36^a$, (see Fig. 10,) which are arranged to engage with a projection $9^b$, extending laterally from the lower surface of the corresponding side of each pattern-plate $9^a$ when the same is brought into a horizontal line with them, but which will not interfere with the vertical movements of the plates.

Each pattern-plate is slid into the corresponding box $4^x$ at a sufficient height to clear the heads $2^a$ of the plungers 2, which are normally held in their raised positions by a spring surrounding each of them and are prevented from rising too high by a pin passing through each of them below the plate 3. The arrangement is such that when the cross-piece $4^a$ starts descending it presses the pattern-plate down onto the heads of the plungers 2 before the box $4^x$ starts descending, the box being balanced by a spring or other suitable means.

It will be evident from the foregoing description that the thickness of the linoleum applied to the backing is regulated by the depth of the layers of linoleum mixture tiered onto the stencil-plates or the sheets of linoleum fed over the same and not by the thickness of the stencil-plates.

To make linoleum of a greater thickness than would be made when proceeding in the manner hereinbefore described, each stencil-plate, after the corresponding pressure-block 4 and plungers 2 have made their first stroke and before they are again raised, may be lifted slightly, so that when the plungers afterward rise the holes in the plate will on the return movement of the tiering-box be able to receive the further quantity of linoleum mixture necessary to produce the extra thickness of linoleum required, the additional quantity of linoleum being afterward pressed through the stencil-plate by the plungers until level with the under side thereof, as before. The said raising of the stencil-plate may be effected by cams 27 in the manner and through the means hereinbefore described, the said cams being, however, each formed with two operating parts of different eccentricity, as indicated in dotted lines, as respects the second part, so that they will act to lift the stencil-plate in two successive steps for each rotation of the shafts.

What I claim is—

1. In a machine for making inlaid linoleum and the like, the combination of a plate formed with a plurality of small holes arranged close together, a plurality of plungers adapted to fit said holes and force material from above said plate through the holes therein, and means for raising and lowering said plungers.

2. In a machine for making inlaid linoleum and the like, the combination of two or more stencil-plates formed with a plurality of small holes arranged close together, means for feeding linoleum or the like over said plates, plungers adapted to fit the holes in said plates, and means for raising and lowering said plungers.

3. A machine for making inlaid linoleum and the like, comprising two or more stencil-plates having the holes therein of small and uniform size, means for feeding linoleum over said plates, means for moving a backing below said plates, plungers adapted to fit the holes in said plates and to force material therethrough onto the backing below, perforated guide-plates corresponding to said stencil-plates and serving to carry and guide said plungers, and means for raising and lowering said plungers.

4. In a machine for making inlaid linoleum and the like, a stencil-plate having a plurality of holes of small and uniform size, means for stopping the holes in said plate not required for use, a guide-plate arranged above and having holes corresponding in shape, size and position to those in said stencil-plate, vertically-movable plungers directed by said guide-plate and adapted to fit the holes in said stencil-plate, and means for raising and lowering said plungers.

5. In a machine for making inlaid linoleum and the like, guide and stencil plates arranged one above the other and each formed with a plurality of holes of small and uniform size, vertically-movable plungers directed by said guide-plate and adapted to fit the holes in said stencil-plate, means for feeding linoleum over said plate and below said plungers, means for feeding a backing below said stencil-plate, and means for raising and lowering said plungers, substantially as described for the purposes specified.

6. In a machine for making inlaid linoleum and the like, a stencil-plate and above it a guide-plate each formed with a plurality of small holes arranged close together, vertically-movable plungers directed by said guide-plate and adapted to fit the holes in said stencil-plate, means for raising said plungers, a pattern block or blocks adapted to depress predetermined plungers, and means for raising and lowering said pattern block or blocks.

7. In a machine for making inlaid linoleum and the like, the combination of stencil and guide plates arranged one above the other and each formed with a plurality of holes of small and uniform size arranged close together, vertically-movable plungers extending through said guide-plate and adapted to fit the holes in said stencil-plate, springs whereby said plungers are normally held in the raised position relatively to said guide-plate, one or more pattern-blocks adapted to depress predetermined plungers, and means for raising and lowering said pattern block or blocks.

8. In a machine for making inlaid linoleum and the like, the combination of stencil and guide plates arranged one above the other and each formed with a plurality of holes of small and uniform size arranged close together, vertically-movable plungers extending through said guide-plate and adapted to fit the holes in said stencil-plate, springs whereby said plungers are normally held in the raised position relatively to said guide-plate, means for supporting a plurality of pattern-plates with blocks of different shapes, means for bringing each of said pattern-plates with blocks into position for use above said plungers, and means for raising and lowering the pattern-plate when in position for use.

9. In a machine for making inlaid linoleum and the like, the combination of stencil and guide plates arranged one above the other and each formed with a plurality of holes of small and uniform size arranged close together, vertically-movable plungers extending through said guide-plate and adapted to fit the holes in said stencil-plate, springs whereby said plungers are normally held in the raised position relatively to said guide-plate, means for distributing granulated linoleum over said stencil-plate, means for feeding a backing below said stencil-plate, pattern-blocks adapted to depress predetermined plungers, and means for raising and lowering said pattern-blocks, substantially as described.

10. A machine for making inlaid linoleum and the like, comprising two or more stencil-plates each formed with a plurality of holes of small and uniform size, arranged close together, two or more guide-plates arranged above said stencil-plates and formed with similar holes, tiering-boxes for distributing layers of granulated linoleum or the like over said plates, means for reciprocating said boxes, means for feeding a backing in an intermittent manner below said stencil-plates, a plurality of plungers extending through and elastically supported by said guide-plates and corresponding in cross-section to the shape and size of the holes in said stencil-plates, pressure-blocks arranged above each of said stencil-plates and the corresponding guide-plate, pattern-blocks carried by said pressure-blocks, and means for raising and lowering each of said pressure-blocks with pattern-blocks, substantially as herein described for the purpose specified.

11. A machine for making inlaid linoleum and the like, comprising two or more stencil-plates each formed with a plurality of holes of small and uniform size arranged close together, two or more guide-plates arranged above said stencil-plates and formed with similar holes, tiering-boxes for distributing layers of granulated linoleum or the like over said plates, means for reciprocating said boxes, means for feeding a backing in an intermittent manner below said stencil-plates, a plurality of plungers extending through and elastically supported by said guide-plates and corresponding in cross-section to the shape and size of the holes in said stencil-plates, pressure-blocks arranged above each of said stencil-plates and the corresponding guide-plate, two or more groups of pattern-plates carrying different pattern-blocks for use with said stencil-plates, means for moving each of said pattern-plates one at a time into engagement with the corresponding pressure-block, and means for raising and lowering each of said pressure-blocks with its pattern-blocks, substantially as described for the purposes specified.

12. In a machine for making inlaid linoleum and the like the combination of a stencil-plate having a plurality of small holes arranged close together, means for feeding a layer of material over said plate, means for feeding a backing below said plate, a pressure-block arranged above said plate, means for raising and lowering the same, a guide-plate having holes corresponding to those in said stencil-plate, said plate being capable of vertical movement relatively to said block, spring-plungers carried by said guide-plate and adapted to fit the holes in said stencil-plate, means for arresting descent of said guide-plate before said pressure-block, and pattern-blocks carried by said pressure-block and adapted during the downward movement of said pressure-block to depress the plungers below them relatively to said pressure-block when motion of said guide-plate is arrested, substantially as herein described for the purposes specified.

Signed at Gloucester, England, this 13th day of July, 1898.

CHARLES HERBERT SCOTT.

Witnesses:
JOHN WATKINS HULBERT,
JOHN EDWARD WESTLE.